Figure 4:
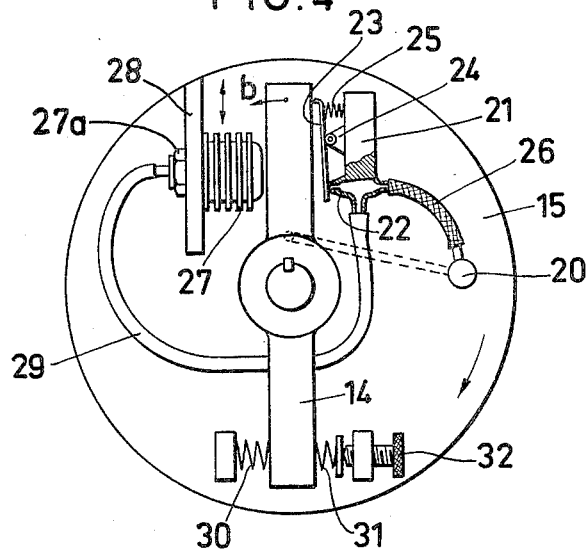

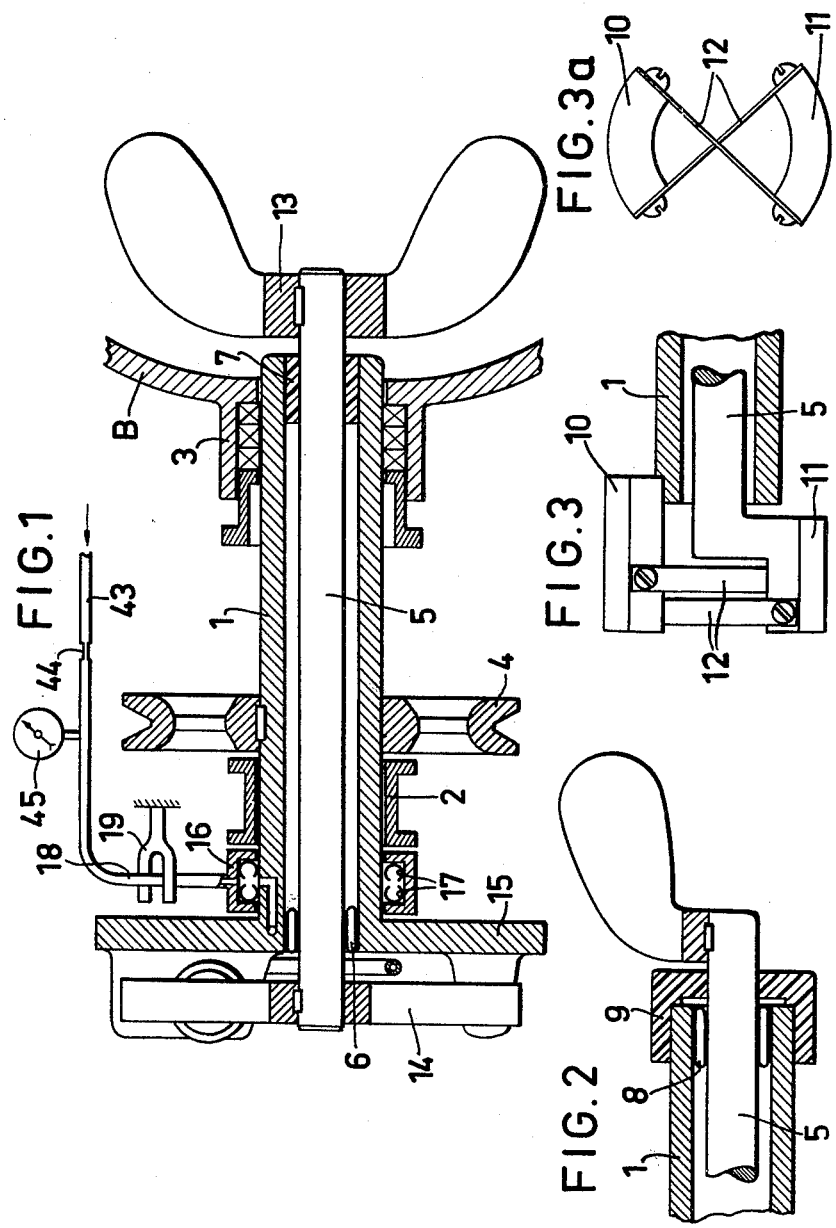

United States Patent Office 3,181,349
Patented May 4, 1965

3,181,349
TORQUE SENSING APPARATUS FOR PULP SUSPENSIONS OR THE LIKE
Johannes Gerhard Jansson, Stockholm, Sweden, assignor to AB A. Ekströms Maskinaffär, Stockholm, Sweden, a joint-stock company of Sweden
Filed Apr. 15, 1963, Ser. No. 273,104
Claims priority, application Sweden, Apr. 27, 1962, 4,777/62
4 Claims. (Cl. 73—59)

This invention relates to apparatus comprising rotor means for sensing variable torques, particularly with the intention of using the variations in the torque necessary to maintain a constant rotor speed, to control the consistency of a pulp suspension or the like.

It is an object of the invention to provide apparatus of the kind referred to in which the friction in the rotor shaft bearings and sealing means, such as stuffing boxes, is essentially eliminated, whereby the torque sensing accuracy may be very substantially improved. The greater accuracy thus attained will afford a better control of, for example, the consistency of a pulp suspension.

According to the invention, the rotor shaft comprises an outer tubular shaft supported in bearings and sealing means, and connected to a drive motor, and an inner shaft which is journalled concentrically within said tubular shaft, and supports the rotor means, there being torque transmitting and torque variation sensing means disposed between said shafts.

This mechanism eliminates the influence of friction emanating from bearings, stuffing boxes and the like, and the torque sensing thus will become more accurate, and may be used to keep the concentration of a pulp suspension or the like constant within much more narrow limits than heretofore. By that reason the quality and uniformity of the processed product will become improved.

Other features and advantages of the invention will become apparent from the following description of embodiments given by way of example, reference being had to the drawings.

In the drawings—

Figure 5:
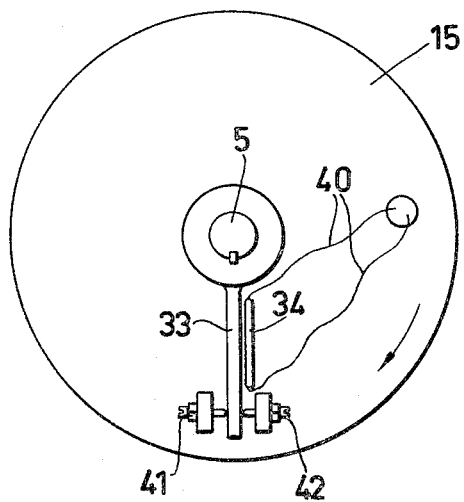
Figure 6:
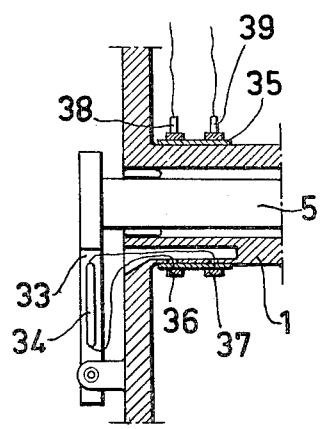

FIG. 1 is a longitudinal section view of a torque variation sensing apparatus according to the invention for sensing the variable consistency of a pulp suspension, FIG. 2 is a partial section view of a modified sensing rotor bearing arrangement for the front end of the inner rotor shaft, FIG. 3 is a partial section view of a modified bearing arrangement for the rear end of the inner rotor shaft, FIG. 3a is an end view of the arrangement in FIG. 3, FIG. 4 is a rear end view of the rotor shafts with means for transmitting torque and for compensating torque variations pneumatically, FIG. 5 is a similar end view as FIG. 4, but with wire strain gauges substituted for the pneumatic arrangement, and FIG. 6 an axial section view of the arrangement of FIG. 5.

With reference to FIG. 1, the wall B of a conventional pulp tank is apertured for the passage of a rotatable tubular shaft 1 which is supported for rotation by a bearing 2 outside the tank, and passes through the tank wall B in a conventional stuffing box 3. A pulley 4 is keyed to shaft 1, and is connected by a V-belt (not illustrated) to a source of power, such as an electric drive motor (not illustrated).

Coaxially within the tubular shaft 1 a second shaft 5 is provided. Shaft 5 is journalled in tubular shaft 1 by means of an anti-friction bearing 6 close to the shaft end lying outside the tank wall B. The front end of shaft 5 extending into the tank and beyond shaft 1 is journalled within the latter by means of a rubber bush 7. This bush 7 serves both as a bearing for shaft 5, which later performs only very small angular motions relative to shaft 1, and as a seal that prevents leakage of the pulp suspension in the tank along shaft 5.

By way of modification, a second anti-friction bearing 8 and a sealing cap 9 of rubber or similar material which prevents the pulp suspension in the tank from leaking out along shaft 5, may be provided instead of rubber bush 7 (see FIG. 2).

The anti-friction bearing 6 for journalling the rear end of shaft 5 in the tubular shaft 1 may be replaced by an arrangement such as shown in FIGS. 3 and 3a. An offset lug 10 on shaft 1 which subtends a center angle of 90° is connected by two crossed leaf springs 12 with a similar, offset lug 11 on shaft 5 subtending an equally great center angle. This arrangement will permit small relative rotative movements between shafts 1 and 5.

The end of shaft 5 extending through tank wall B and beyond tubular shaft 1 supports a rotor 13 which rotates by the action of the drive torque applied to shaft 1 and transmitted to shaft 5. For this torque transmission a crosspiece 14 is provided (see FIGS. 1 and 4), rigidly mounted on shaft 5, and to which the rotation is transmitted by a disc or plate 15 formed at or secured to the rear end of shaft 1.

The transmission of the power is pneumatically controlled in the following manner. The tubular shaft 1 is coaxially surrounded by a stationary annular air housing 16 which is sealed against ambient air by axle seals 17. The air housing 16 is connected by a tube 18 to a compressed air source (not illustrated), and a stationary fork member 19 engages the tube 18 and prevents the air housing 16 from rotating with the shaft 1. From the air housing 16 a passage 20 is provided in the shaft 1, and is continued by a flexible tube 26 to a nozzle housing 21 secured to plate 15. The tube 26 is connected to a nozzle 22 which normally is obstructed by a tongue or leaf 23 which is hingedly connected to the nozzle housing 21 by means of a pivot 24. The tongue 23 is normally held in a position in which it obstructs the passage through the nozzle, by a compression spring 25 which is disposed between the tongue and the nozzle housing.

The torque is transmitted from disc 15 to the crosspiece 14 by a sheet metal bellows 27 secured by means of a union 27a to a lug 28 on disc 15. The lug 28 is formed to permit the contact between the bellows 27 and the crosspiece 14 to be set at predetermined different points along the length of the crosspiece, and consequently a suitable torque range may be selected before the actual operation. The nozzle 22 and bellows 27 are connected by a flexible conduit 29, and the nozzle is kept obstructed by the tongue 23 until the torque has increased so much that the bellows 27 must press against the crosspiece 14 with so great a force that the crosspiece is pressed in its turn harder against the bent-off rear portion or lug on the tongue 23. The latter will as a result be moved away from the nozzle 22. This results in releasing a small quantity of air, and the pressure rise which is used in a conventional control device for diminishing the pulp concentration, in a suspension, or a similar purpose, is smoothed out.

The relative angular displacements between the crosspiece 14 and disc 15 are stabilized by means of a spring 31 which may be pre-tensioned to different degrees with an adjusting screw 32, and a second spring 30 acting in the opposite direction.

If the torque which brakes the rotation of the rotor 13 decreases, the force acting against the bellows 27 is reduced, and the pressure within the bellows drops. The pressure drop is used for causing the control device to raise the pulp concentration, until a balanced condition is reestablished.

The compressed air to the system is delivered from a conduit 43 through a source of compressed air (not illustrated) through a restriction 44 to conduit 18, a pressure meter 45 being provided in the latter. The pressure meter may be adapted, in a manner known per se, to give control impulses in response to a rise or fall of the pressure above or below a predetermined pressure range. The restricted pressure acting against tongue 23 should be, of course, very small.

The pneumatic arrangement illustrated in FIGS. 1 and 4 may be replaced by an electromechanical system as shown in FIGS. 5 and 6. The crosspiece 33 is flexible and provided with a wire strain gauge 34. The torque transmission between disc 15 and the crosspiece 33 is effected by opposed set screws 41, 42 threaded into lugs projecting from disc 15. The shaft 1 is provided with an insulating sleeve 35 supporting a pair of contact rings 36, 37. The latter are engaged by contact members or brushes 38, 39 which are connected to an electrically governed control device, known in itself, and the rings 36, 37 are connected through conductors 40 to the ends of the wire strain gage 34. The electric current is delivered by a suitable source, and the control circuit will act analogously to the pneumatic system earlier described and in a manner easily understood by those skilled in the art to give control impulses when the torque varies.

The protection is not limited to the described and illustrated embodiments, but should extend as well to all modifications which lie within the scope of the appended claims.

What I claim is:

1. A torque sensing apparatus for use in determining the density of a solution, said apparatus comprising a container for the solution, a tubular shaft rotatably mounted in a wall of said container and projecting exteriorly thereof, means to drive said shaft, means to seal said shaft against leakage from said container, a second shaft rotatably mounted within said tubular shaft, the inner end of said second shaft projecting inwardly of the inner end of said tubular shaft into said container, the outer end of said second shaft projecting outwardly of the outer end of said tubular shaft, means to prevent leakage between said second shaft and said tubular shaft, a rotor fixed to the inner end of said second shaft, vanes on said rotor, a disk fixed to the outer end of said tubular shaft, a cross arm fixed to the outer end of said second shaft, yieldable means interposed between one arm of said cross arm and said disk for transmitting torque from said disk to said cross arm and for yieldably opposing relative rotary movement of said cross arm with respect to said disk, fluid pressure operated expansible and contractable means mounted on said disk and engaging the other end of said cross arm, contraction of said last named means permitting movement of said cross arm with respect to said disk in a direction opposite to the direction of rotation of said disk and expansion of said last named means moving said cross arm with respect to said disk in the same direction as the direction of rotation of said disk, a nozzle fixed to said disk, means connecting said nozzle to a source of fluid pressure, a conduit connecting said nozzle and said expansible and contractable means, said nozzle having an exhaust opening, a valve for controlling flow through said exhaust opening, said valve being disposed in the path of movement of said other arm of said cross arm, spring means urging said valve toward closed position, said valve serving to control fluid pressure in said expansible and contractable means, and indicating means responsive to the pressure in said expansible means.

2. An apparatus as defined in claim 1, in which said yieldable means is adjustable and in which said expansible and contractable means comprises a bellows.

3. An apparatus as defined in claim 1, in which said valve comprises a leaf pivotally mounted intermediate the length thereof on said disk, one end of said leaf being movable into engagement with said nozzle to close the exhaust opening, and a lug on the opposite end of said leaf engageable by said other end of said cross arm to move said one end of said leaf away from said nozzle.

4. An apparatus as defined in claim 1, in which said yieldable means comprises opposed compression springs mounted on said disk and engaging opposite sides of said one arm of said cross arm, and means for adjusting one of said compression springs.

References Cited by the Examiner
UNITED STATES PATENTS

| | | | |
|---|---|---|---|
| 2,359,125 | 9/44 | Langer et al. | 73—136 |
| 2,365,443 | 12/44 | Angst | 73—136 |
| 2,403,952 | 7/46 | Ruge | 73—136 |
| 2,434,098 | 1/48 | Bays. | |
| 2,603,967 | 7/52 | Carlson | 73—101 |
| 2,999,294 | 9/61 | Magarshack et al. | 73—136 X |
| 3,079,788 | 3/63 | Trotin | 73—59 |

RICHARD C. QUEISSER, *Primary Examiner.*

JOSEPH P. STRIZAK, *Examiner.*